(12) United States Patent
Sutton et al.

(10) Patent No.: US 8,114,324 B2
(45) Date of Patent: Feb. 14, 2012

(54) APPARATUS AND METHOD FOR PRESSING AN OUTER WALL OF PIPE

(75) Inventors: Gerald S. Sutton, Hamilton, OH (US); David J. Kelley, Hamilton, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 158 days.

(21) Appl. No.: 12/251,034

(22) Filed: Oct. 14, 2008

(65) Prior Publication Data

US 2010/0090366 A1  Apr. 15, 2010

(51) Int. Cl.
*B28B 3/12* (2006.01)
(52) U.S. Cl. ............... 264/171.29; 425/363; 156/391
(58) Field of Classification Search .............. 425/111, 425/367, 385, 392, 363; 156/391, 392, 555; 264/171.29
See application file for complete search history.

(56) References Cited

U.S. PATENT DOCUMENTS

| | | | |
|---|---|---|---|
| 2,700,631 A | 1/1955 | Sussenbach et al. | |
| 2,753,596 A | 7/1956 | Bailey | |
| 2,877,150 A | 3/1959 | Wilson | |
| 2,888,954 A | 6/1959 | Gates | |
| 2,931,069 A | 4/1960 | McCormick | |
| 3,081,102 A | 3/1963 | Murray et al. | |
| 3,238,752 A * | 3/1966 | Dilling ........................... | 72/19.2 |
| 3,379,805 A | 4/1968 | Roberts | |
| 3,490,496 A | 1/1970 | Stearns | |
| 3,538,209 A | 11/1970 | Hegler | |
| 3,573,871 A | 4/1971 | Warner | |
| 3,605,232 A | 9/1971 | Hines | |
| 3,649,730 A | 3/1972 | Lachenmayer et al. | |
| 3,677,676 A | 7/1972 | Hegler | |
| 3,725,565 A | 4/1973 | Schmidt | |
| 3,802,908 A | 4/1974 | Emmons | |
| 3,819,292 A | 6/1974 | Wentworth | |
| 3,824,886 A | 7/1974 | Hegler | |
| 3,837,364 A | 9/1974 | Jenner | |
| 3,864,981 A * | 2/1975 | Schlegel ........................... | 74/55 |
| 3,869,235 A | 3/1975 | Moore | |
| 3,944,641 A | 3/1976 | Lemelson | |

(Continued)

FOREIGN PATENT DOCUMENTS

DE        1 278 734          9/1968

(Continued)

OTHER PUBLICATIONS

U.S. Appl. No. 11/078,323 filed Mar. 14, 2005, entitled "Corrugated Pipe with Outer Layer".

(Continued)

*Primary Examiner* — Joseph S. Del Sole
*Assistant Examiner* — James Sanders
(74) *Attorney, Agent, or Firm* — Finnegan, Henderson, Farabow, Garrett & Dunner, LLP (57) ABSTRACT

A method of pressing an outer wall of polymer pipe is provided. The method includes extruding a layer of polymer onto a pipe to form an outer wall of pipe; conveying the pipe including the outer wall of pipe through a pressing apparatus having a pressing element configured to rotate about the pipe; and urging the pressing element against an exterior surface of the outer wall as the pressing element rotates about a pipe conveyed through the pressing apparatus. An apparatus for pressing an outer wall of polymer pipe is also provided.

20 Claims, 4 Drawing Sheets

U.S. PATENT DOCUMENTS

| | | | |
|---|---|---|---|
| 3,957,386 A | 5/1976 | Lupke | |
| 4,042,661 A | 8/1977 | Cook | |
| 4,113,411 A | 9/1978 | Terragni | |
| 4,165,214 A | 8/1979 | Lupke et al. | |
| 4,180,357 A | 12/1979 | Lupke | |
| RE30,369 E * | 8/1980 | Wilson | 156/392 |
| 4,218,164 A | 8/1980 | Lupke | |
| 4,219,293 A | 8/1980 | Licht | |
| 4,220,181 A | 9/1980 | Nyssen | |
| 4,223,895 A | 9/1980 | Roberts, Jr. et al. | |
| 4,230,157 A | 10/1980 | Larsen et al. | |
| 4,262,162 A | 4/1981 | Plinke et al. | |
| 4,281,981 A | 8/1981 | Feldman | |
| 4,319,476 A | 3/1982 | Fuchs, Jr. | |
| 4,352,701 A | 10/1982 | Shimba et al. | |
| 4,377,545 A | 3/1983 | Hornbeck | |
| 4,397,797 A | 8/1983 | Nojiri et al. | |
| 4,402,658 A | 9/1983 | Larsen | |
| 4,415,389 A | 11/1983 | Medford et al. | |
| 4,436,679 A | 3/1984 | Winstead | |
| 4,439,130 A | 3/1984 | Dickhut et al. | |
| 4,492,551 A | 1/1985 | Hegler et al. | |
| 4,523,613 A | 6/1985 | Fouss et al. | |
| 4,528,832 A | 7/1985 | Fuchs, Jr. | |
| 4,534,923 A | 8/1985 | Lupke | |
| 4,547,246 A | 10/1985 | Viriyayuthakorn et al. | |
| 4,562,990 A | 1/1986 | Rose | |
| 4,572,523 A | 2/1986 | Guettouche et al. | |
| 4,588,546 A | 5/1986 | Feil et al. | |
| 4,666,649 A | 5/1987 | Takubo et al. | |
| 4,678,526 A | 7/1987 | Hawerkamp | |
| 4,683,166 A | 7/1987 | Yuto et al. | |
| 4,703,639 A | 11/1987 | Fuchs, Jr. | |
| 4,756,339 A | 7/1988 | Buluschek | |
| 4,779,651 A | 10/1988 | Hegler et al. | |
| 4,789,327 A | 12/1988 | Chan et al. | |
| 4,808,098 A | 2/1989 | Chan et al. | |
| 4,846,660 A | 7/1989 | Drossbach | |
| 4,849,113 A | 7/1989 | Hills | |
| 4,854,416 A | 8/1989 | Lalikos et al. | |
| 4,862,728 A | 9/1989 | Hardouin | |
| 4,862,924 A | 9/1989 | Kanao | |
| 4,900,503 A | 2/1990 | Hegler et al. | |
| 4,906,496 A | 3/1990 | Hosono et al. | |
| 4,970,351 A | 11/1990 | Kirlin | |
| 5,045,254 A | 9/1991 | Peelman et al. | |
| 5,058,934 A | 10/1991 | Brannon | |
| 5,089,074 A | 2/1992 | Winter et al. | |
| 5,124,109 A | 6/1992 | Drossbach | |
| 5,129,428 A | 7/1992 | Winter et al. | |
| 5,129,429 A | 7/1992 | Winter et al. | |
| 5,129,685 A | 7/1992 | Engel | |
| 5,145,545 A | 9/1992 | Winter et al. | |
| 5,156,901 A | 10/1992 | Tanaka | |
| 5,192,834 A | 3/1993 | Yamanishi et al. | |
| 5,222,288 A | 6/1993 | Thomas | |
| 5,228,479 A | 7/1993 | Thomas | |
| 5,256,233 A | 10/1993 | Winter et al. | |
| 5,262,109 A | 11/1993 | Cook | |
| 5,275,544 A | 1/1994 | Marlowe | |
| 5,279,332 A | 1/1994 | Winter et al. | |
| 5,291,769 A * | 3/1994 | Miyano | 72/121 |
| 5,314,553 A | 5/1994 | Hashimoto et al. | |
| 5,330,600 A | 7/1994 | Lupke | |
| 5,346,384 A | 9/1994 | Hegler et al. | |
| 5,372,774 A | 12/1994 | Lupke | |
| 5,383,497 A | 1/1995 | Winter et al. | |
| 5,383,998 A | 1/1995 | Lupke | |
| 5,391,334 A | 2/1995 | Enomoto | |
| 5,394,904 A | 3/1995 | Winter et al. | |
| 5,441,083 A | 8/1995 | Korsgaard | |
| 5,460,771 A | 10/1995 | Mitchell et al. | |
| 5,462,090 A | 10/1995 | Winter et al. | |
| 5,466,402 A | 11/1995 | Lupke | |
| 5,469,892 A | 11/1995 | Noone et al. | |
| 5,472,659 A | 12/1995 | Hegler et al. | |
| 5,472,746 A | 12/1995 | Miyajima et al. | |
| 5,522,718 A | 6/1996 | Dietrich | |
| 5,531,952 A | 7/1996 | Hatfield | |
| 5,545,369 A | 8/1996 | Lupke | |
| 5,572,917 A | 11/1996 | Truemner et al. | |
| 5,608,637 A | 3/1997 | Wang et al. | |
| 5,620,722 A | 4/1997 | Spina | |
| 5,649,713 A | 7/1997 | Ledgerwood | |
| 5,706,864 A | 1/1998 | Pfleger | |
| 5,715,870 A | 2/1998 | Winter et al. | |
| 5,759,461 A | 6/1998 | Jarvenkyla et al. | |
| 5,773,044 A | 6/1998 | Dietrich et al. | |
| 5,848,618 A | 12/1998 | Guest | |
| 5,894,865 A | 4/1999 | Winter et al. | |
| 5,901,754 A | 5/1999 | Elsässer et al. | |
| 5,904,643 A | 5/1999 | Seeberger et al. | |
| 5,909,908 A | 6/1999 | Furuse | |
| 5,912,023 A | 6/1999 | Katoh et al. | |
| 5,975,143 A | 11/1999 | Järvenkylä et al. | |
| 5,976,298 A | 11/1999 | Hegler et al. | |
| 6,000,434 A | 12/1999 | Winter et al. | |
| 6,016,848 A | 1/2000 | Egres, Jr. | |
| 6,039,082 A | 3/2000 | Winter et al. | |
| 6,062,268 A | 5/2000 | Elsässer et al. | |
| 6,082,741 A | 7/2000 | Gregoire et al. | |
| 6,161,591 A | 12/2000 | Winter et al. | |
| 6,186,182 B1 | 2/2001 | Yoon | |
| 6,199,592 B1 | 3/2001 | Siferd et al. | |
| 6,240,969 B1 | 6/2001 | Wildermuth | |
| 6,335,101 B1 | 1/2002 | Haeger et al. | |
| 6,399,002 B1 | 6/2002 | Lupke et al. | |
| 6,405,974 B1 | 6/2002 | Herrington | |
| 6,461,078 B1 | 10/2002 | Presby | |
| 6,491,994 B1 | 12/2002 | Kito et al. | |
| 6,524,519 B1 | 2/2003 | Ohba et al. | |
| 6,555,243 B2 | 4/2003 | Flepp et al. | |
| 6,591,871 B2 | 7/2003 | Smith et al. | |
| 6,607,010 B1 | 8/2003 | Kashy | |
| 6,631,741 B2 | 10/2003 | Katayama et al. | |
| 6,645,410 B2 | 11/2003 | Thompson | |
| 6,682,677 B2 | 1/2004 | Lobovsky et al. | |
| 6,696,011 B2 | 2/2004 | Yun et al. | |
| 6,719,302 B2 | 4/2004 | Andrick | |
| 6,787,092 B2 | 9/2004 | Chan et al. | |
| 6,848,464 B2 | 2/2005 | Ransom | |
| 6,848,478 B2 | 2/2005 | Nagai | |
| 6,854,168 B2 | 2/2005 | Booms et al. | |
| 6,933,028 B2 | 8/2005 | Milhas | |
| 6,935,378 B2 | 8/2005 | Ikemoto et al. | |
| 6,955,780 B2 | 10/2005 | Herrington | |
| 7,074,027 B2 | 7/2006 | Starita | |
| 7,114,944 B2 | 10/2006 | Wolfe et al. | |
| 7,118,369 B2 | 10/2006 | Dietrich et al. | |
| 7,122,074 B2 | 10/2006 | Kim | |
| 7,140,859 B2 | 11/2006 | Herrington | |
| 7,156,128 B1 | 1/2007 | Kanao | |
| 7,185,894 B2 | 3/2007 | Kish et al. | |
| 7,347,225 B2 | 3/2008 | Nobileau | |
| 2002/0179232 A1 | 12/2002 | Thompson | |
| 2004/0146696 A1 | 7/2004 | Jones | |
| 2004/0187946 A1 | 9/2004 | Herrington | |
| 2004/0241368 A1 | 12/2004 | Iwata et al. | |
| 2005/0161947 A1 | 7/2005 | Skinner et al. | |
| 2006/0293159 A1 | 12/2006 | Neubauer | |
| 2007/0204929 A1 | 9/2007 | Jarvenkyla | |
| 2008/0118596 A1 | 5/2008 | Hetzner et al. | |

FOREIGN PATENT DOCUMENTS

| | | |
|---|---|---|
| DE | 1 704 718 | 7/1971 |
| DE | 2 042 031 | 5/1972 |
| DE | 2 413 878 | 2/1976 |
| DE | 2 403 618 | 12/1980 |
| DE | 2 804 540 C2 | 1/1984 |
| DE | 297 06 045 | 6/1997 |
| EP | 0 041 252 | 12/1981 |
| EP | 0 096 957 B1 | 5/1989 |
| EP | 0 385 465 A2 | 3/1990 |
| EP | 0 385 465 B1 | 3/1990 |
| EP | 500216 A2 * | 8/1992 |
| EP | 0 581 064 A1 | 7/1993 |
| EP | 0 726 134 B1 | 2/1996 |

| | | |
|---|---|---|
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1 148 277 | 4/1969 |
| GB | 2 300 684 | 11/1996 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

Non-final Office Action dated Jul. 3, 2007, in U.S. Appl. No. 11/078,323.

Final Office Action dated Dec. 27, 2007, in U.S. Appl. No. 11/078,323.

Non-final Office Action dated May 29, 2008, in U.S. Appl. No. 11/078,323.

*Modern Plastics Worldwide*, Apr. 2008 edition, p. 35, "Device offers alternative for constant flow filtration."

\* cited by examiner

APPARATUS AND METHOD FOR PRESSING AN OUTER WALL OF PIPE

TECHNICAL FIELD

The present invention relates to manufacturing three-wall corrugated pipe walls, and more particularly, to an apparatus and method for pressing an outer wall of pipe after the outer wall is extruded onto a dual-wall corrugated pipe.

BACKGROUND

Drainage pipe has long been used for transporting water in various agricultural, residential, civil engineering, and other construction applications. For example, drainage pipe has been used to create storm sewer systems configured to collect and dispose of water "run-off." Traditionally, drainage pipe was made from clay or concrete, which caused the pipe to be heavy, expensive, and brittle. In order to improve the ease-of-installation, cost-effectiveness, and durability of drainage pipes, pipes are now often manufactured from alternative materials, including various polymers and polymer blends.

One method of manufacturing polymer pipe involves forming a polymer pipe and then extruding an outer layer of polymer onto the outside of the polymer pipe. As a result, the outer layer of polymer constitutes an outer pipe wall that is fused to the exterior surface of the polymer pipe. This outer layer of polymer is generally extruded at a temperature sufficiently high to allow it to bond with the exterior surface of the polymer pipe. Specifically, the extruded outer layer of polymer is extruded at a temperature hot enough to at least partially melt the exterior surface of the polymer pipe, such that polymer chains of the exterior surface and the extruded outer wall intersperse and then cool together. This results in the exterior surface and the extruded outer wall being integrally fused or bonded together wherever they contact each other.

Even when the outer layer of polymer is extruded at a high temperature, the outer layer can sometimes insufficiently bond or fuse to the exterior surface of the pipe. Specifically, even though a very thin layer of the exterior surface may weld to the newly extruded outer layer, the level of bonding may be too shallow to provide a sufficient weld between the outer layer and the exterior pipe surface. Thus, a high extrusion temperature can sometimes be insufficient for thoroughly bonding an outer layer beyond the immediately exterior surface of a polymer pipe.

Accordingly, there is a need for an apparatus and method for pressing an outer wall of pipe to achieve sufficient bonding between an outer layer of polymer and the polymer pipe.

SUMMARY

It is an object of the present invention to provide such an apparatus and method for pressing an outer wall of pipe.

One exemplary embodiment of the present disclosure provides a method of pressing an outer wall of polymer pipe. The method includes extruding a layer of polymer onto a pipe to form an outer wall of pipe; conveying the pipe including the outer wall of pipe through a pressing apparatus having a pressing element configured to rotate about the pipe; and urging the pressing element against an exterior surface of the outer wall as the pressing element rotates about a pipe conveyed through the pressing apparatus.

Another exemplary embodiment of the present disclosure provides an apparatus for pressing an outer wall of polymer pipe. The apparatus includes a frame having an annular carriage; and a pressing element configured to rotate about a path defined by the annular carriage; wherein the pressing element is configured to press an outer wall of polymer pipe when the pipe is conveyed through the annular carriage.

Yet another exemplary embodiment of the present disclosure provides an apparatus for pressing an outer wall of polymer pipe. The apparatus includes a frame having a bearing; an annular carriage configured to rotate about the bearing; and a pressing element translatably mounted to the annular carriage; wherein the pressing element is configured to press an outer layer of pipe when the pipe is conveyed through the annular carriage.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the disclosure, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

DESCRIPTION OF THE EXEMPLARY EMBODIMENTS

Reference will now be made in detail to the exemplary embodiments described above and illustrated in the accompanying drawings.

During the manufacture of multi-wall polymer pipe, concentric tubes of polymer may be continuously extruded from one or more extrusion dies. A corrugator may be used to form corrugations into one or more of the layers of polymer as they continuously translate away from the extrusion dies. In one embodiment, a corrugator may be used to form dual-wall pipe having a smooth inner wall and a corrugated wall. The corrugated wall may have a plurality of alternating corrugation crests and corrugation valleys, with the corrugation valleys being fused to the smooth inner wall. In order to improve the performance of such a pipe, it may be desirable to extrude an additional layer of polymer onto the pipe. For example, a cross-head die may be used to extrude an outer layer of polymer onto the exterior surface of the corrugated wall, thereby forming three-wall, corrugated polymer pipe.

The outer layer of polymer may be extruded at a temperature high enough to at least partially bond or fuse the outer layer of polymer to corrugation crests of the corrugated wall. For example, the hot outer layer of polymer may at least partially melt the corrugation crests of the corrugated wall. Alternatively, the corrugation crests of the corrugated wall may be heated by use of a separate heating element, in order to increase their level of bonding with the extruded outer layer. However, a high extrusion temperature can sometimes be insufficient for thoroughly bonding an outer layer beyond the immediately exterior surface of a polymer pipe. For this reason, pressure may be applied to the outer layer to increase the depth of bonding beyond the immediately exterior surface of the polymer pipe. Thus, in some cases, it may be desirable to press an outer layer of polymer pipe against the exterior surface of a dual-wall corrugated polymer pipe after the outer layer of polymer is extruded onto the dual-wall corrugated polymer pipe.

Figure 1:
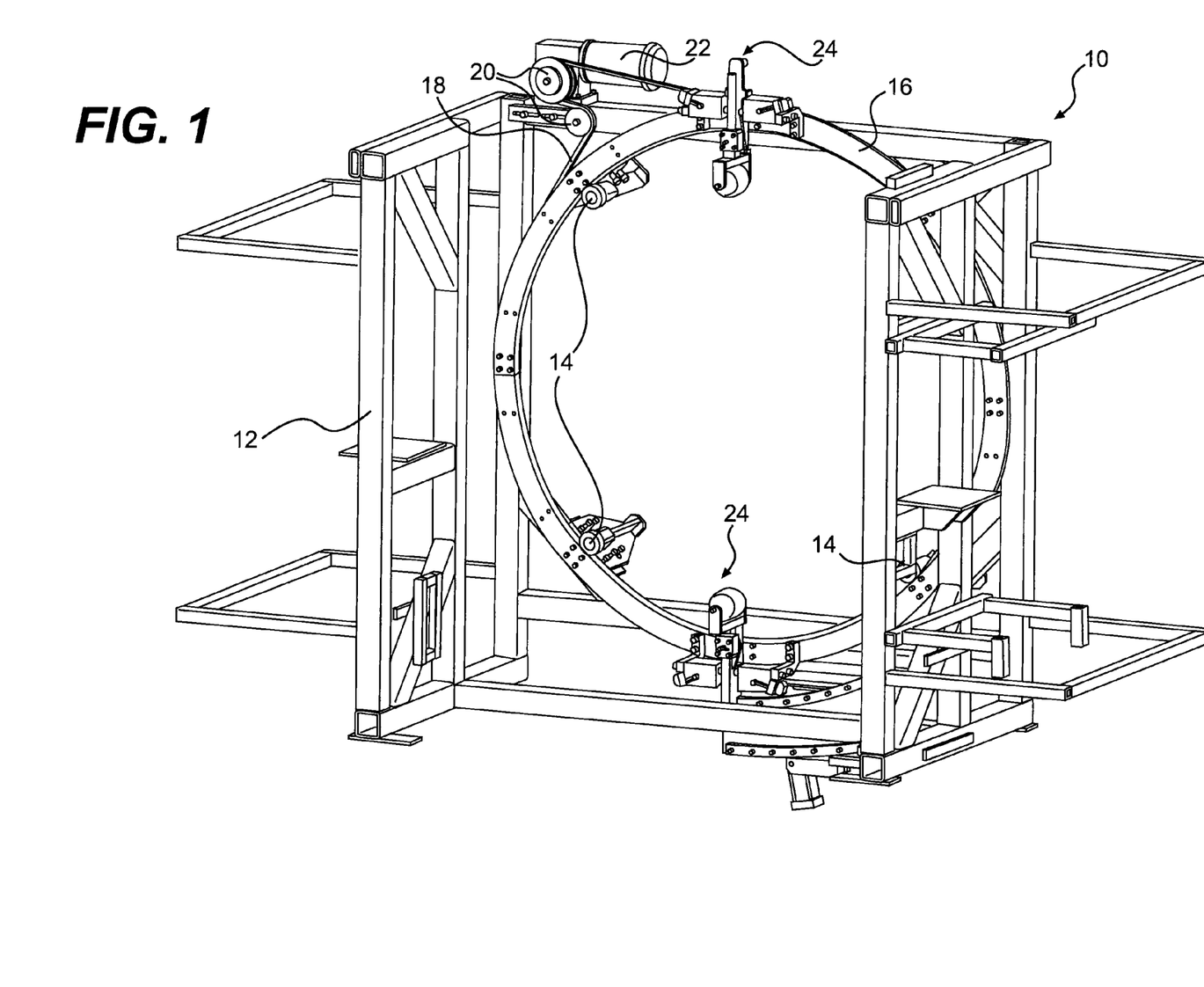
FIG. 1 is a perspective view of an exemplary embodiment of a press rolling apparatus for pressing an outer wall of pipe.

FIG. 1 illustrates an exemplary embodiment of a press rolling apparatus 10. Press rolling apparatus 10 may include a frame 12 having a plurality of bearings 14 disposed thereon. In one embodiment, frame 12 may have four bearings 14, each of the four bearings 14 being rotatably disposed on a quadrant of frame 12. Press rolling apparatus 10 may further include an annular carriage 16. Annular carriage 16 may be rotatably disposed on and engaged with bearings 14. Thus, annular carriage 16 may be configured to rotate about a central axis, relative to frame 12, as guided by bearings 14.

Press rolling apparatus 10 may further include a drive belt 18, a pulley system 20, and a motor 22. Drive belt 18 may be configured to be wrapped around an outer groove disposed in annular carriage 16 and around wheels of pulley system 20. At least one wheel of pulley system 20 may be driven by motor 22. Thus, motor 22 may be configured to selectively control a rotation of annular carriage 16 by manipulating drive belt 18 via pulley system 20. Annular carriage 16 may be selectively rotated by any other suitable mechanism, such as a rack and pinion drive, a spiral gear, a gas spring, a crank system, a hydraulic system, a pneumatic system, and/or an electromagnetic drive.

Press rolling apparatus 10 may further include a plurality of press rolling mechanisms 24 disposed on annular carriage 16. As illustrated in the embodiment of FIG. 1, press rolling apparatus 10 may include two press rolling mechanisms 24, each being disposed 180° apart from each other on annular carriage 16. Alternatively, press rolling apparatus 10 may include any number of press rolling mechanisms 24, as desired. As will be described in greater detail below, each press rolling mechanism 24 may be provided with a pressing element configured to press against an outer wall of pipe as the pipe is conveyed through press rolling apparatus 10. Even though press rolling apparatus 10 will be described with respect to an embodiment in which press rolling mechanisms 24 are attached to a rotating annular carriage 16, any equivalent or similar mechanism may be used. For example, annular carriage 16 may be fixed to frame 12, and a pressing element may be configured to advance around a circumferential path of annular carriage 16 in any way that suitably rotates the pressing element about a pipe conveyed through press rolling apparatus 10.

Figure 2:
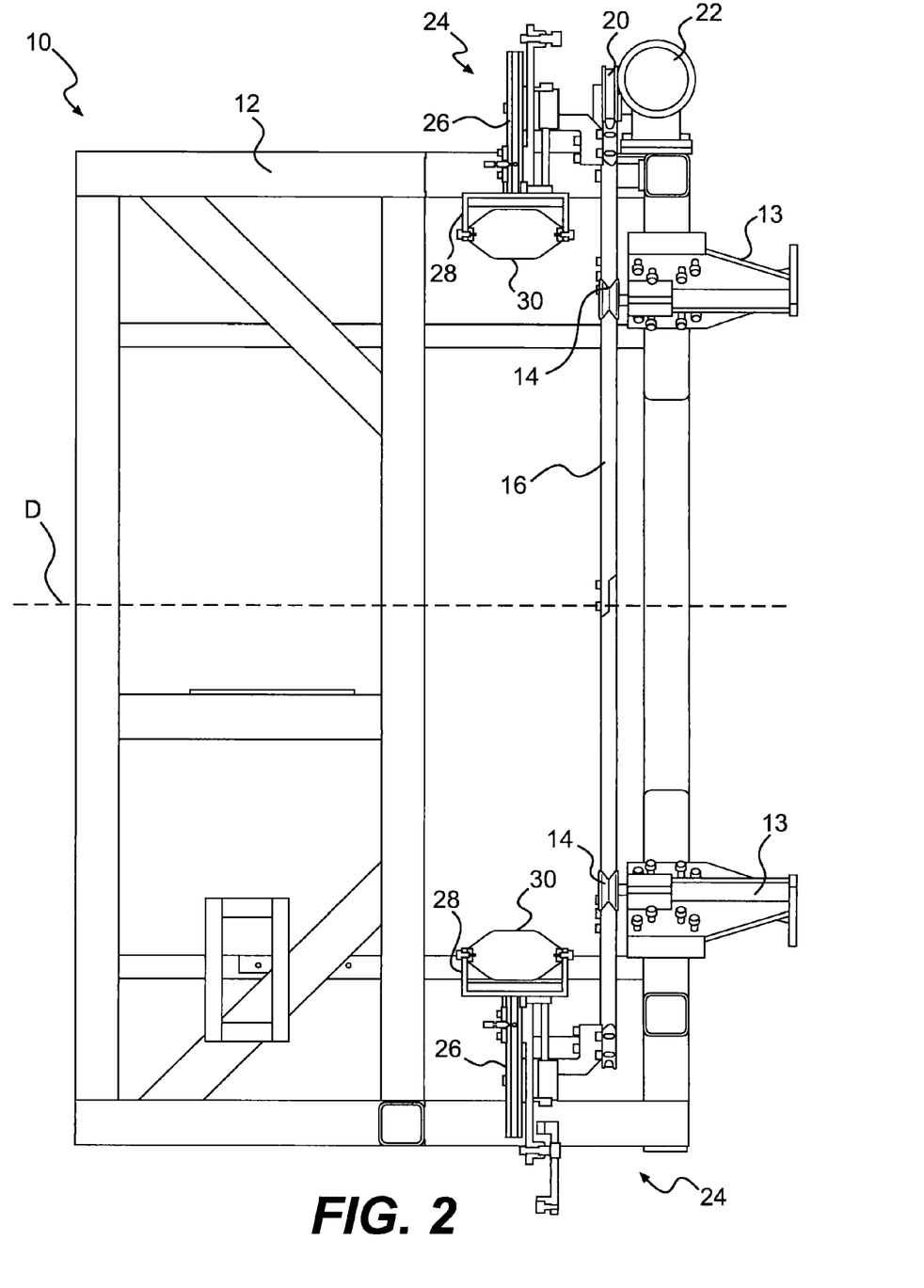
FIG. 2 is a side view of the exemplary press rolling apparatus depicted in FIG. 1.

FIG. 2 illustrates a side view of an exemplary embodiment of press rolling apparatus 10. As described above, press rolling apparatus 10 may include frame 12 having bearings 14. Annular carriage 16 may be rotatably disposed on bearings 14. Motor 22 and pulley system 20 may be configured to rotate annular carriage 16 on bearings 14. Annular carriage 16 may rotate about a central axis "D", along which a pipe may be continuously conveyed through press rolling apparatus 10. In the exemplary embodiment of FIG. 2, two press rolling mechanisms 24 are illustrated as being disposed 180° apart from each other on annular carriage 16.

In one embodiment, each press rolling mechanism 24 may include a linkage 26, a bracket 28, and a pressing element 30. Linkage 26 may translatably mount bracket 28 to annular carriage 16. Bracket 28 may rotatably mount pressing element 30 to linkage 26. It will be appreciated that any equivalent or similar system of brackets and linkages may be used to allow pressing element 30 to translate and/or rotate relative to annular carriage 16 and/or frame 12 of press rolling apparatus 10, as desired.

Figure 3:
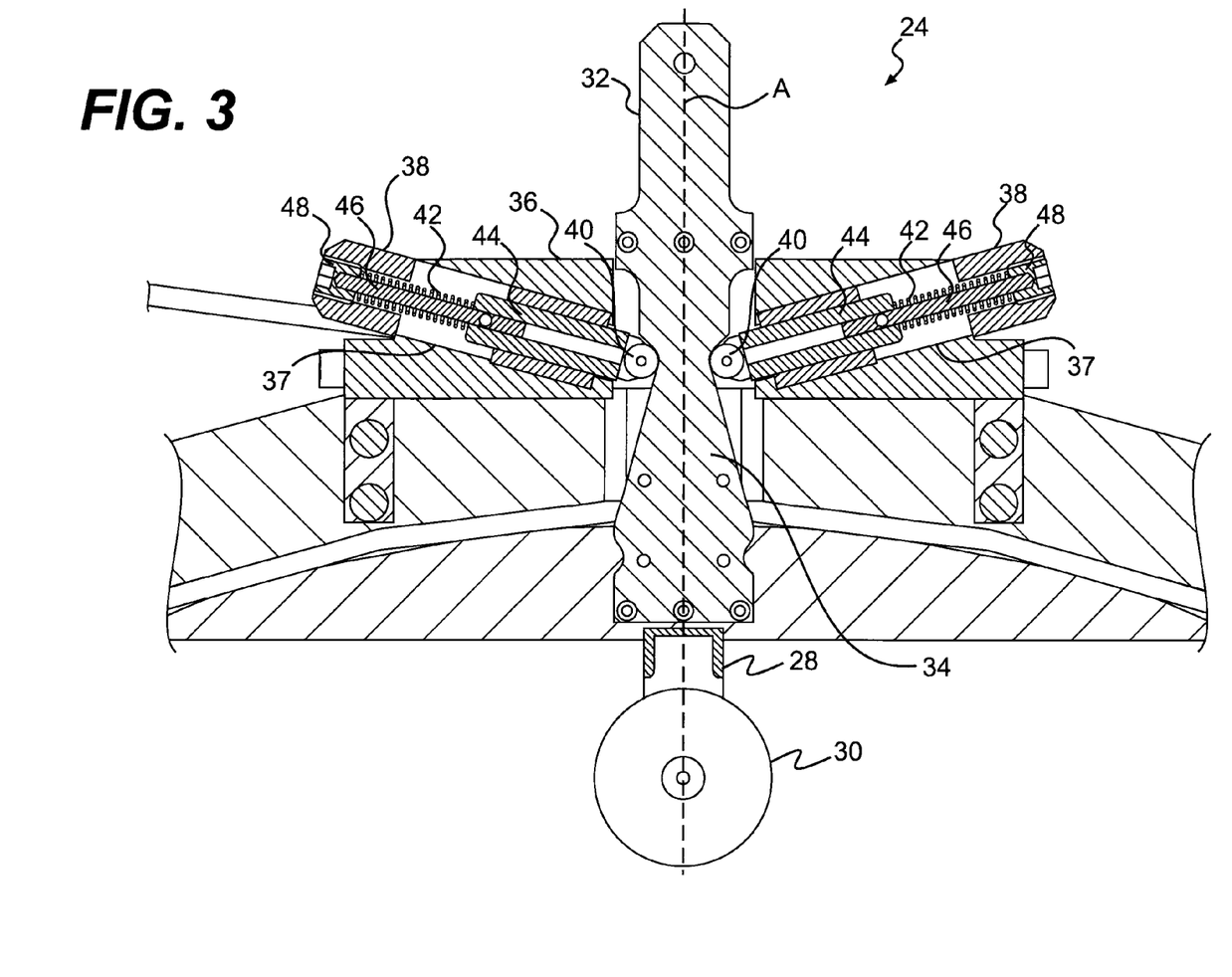
FIG. 3 is a cross-sectional view of a portion of the exemplary press rolling apparatus depicted in FIGS. 1 and 2.

FIG. 3 illustrates a cross-section of one exemplary embodiment of a press rolling mechanism 24. Press rolling mechanism 24 may include a translating member 32, a bracket 28, and a pressing element 30. Translating member 32, bracket 28, and pressing element 30 may be fixed to each other in series, as shown in FIG. 3, and configured to translate together along an axis "A" through a block 36 mounted to annular carriage 16. Translating member 32 may include an angled plate 34 disposed integrally therein. Press rolling mechanism 24 may also include a plurality of opposing cam followers 40 configured to engage opposing faces of angled plate 34. Each cam follower 40 may be rotatably disposed at an end of a cylinder 44 connected to a threaded rod 46. Cam follower 40, cylinder 44, and threaded rod 46 may be configured to translate together in a bore 37 formed in block 36. A compression spring 42 may be disposed around threaded rod 46 between cylinder 44 and a threaded bolt 48 disposed in an end cap 38. Compression spring 42 may be configured to urge cylinder 44, and therefore cam follower 40 in a direction toward axis "A". As shown in the exemplary embodiment of FIG. 3, a pair of opposing cam followers 40 may be configured to contact and press against opposing faces of angled plate 34. Given a particular geometry of angled plate 34, compression springs 42 and cam followers 40 may urge translating member 32, bracket 28, and pressing element 30 along axis "A" toward a center point of annular carriage 16. Thus, pressing element 30 may be urged in a direction towards an axis along which a pipe may be conveyed through annular carriage 16 of press rolling apparatus 10. An amount of urging provided by compression springs 42 may be adjusted by turning threaded bolts 48 so as to compress or relax compression springs 42. Any other suitable device may be used to selectively urge pressing element 30 toward a center point of annular carriage 16. For example, a rack and pinion drive, a spiral gear, a gas spring, a crank system, a hydraulic system, a pneumatic system, and/or an electromagnetic drive may be used to selectively urge pressing member 30 toward a center point of annular carriage 16.

Figure 4:
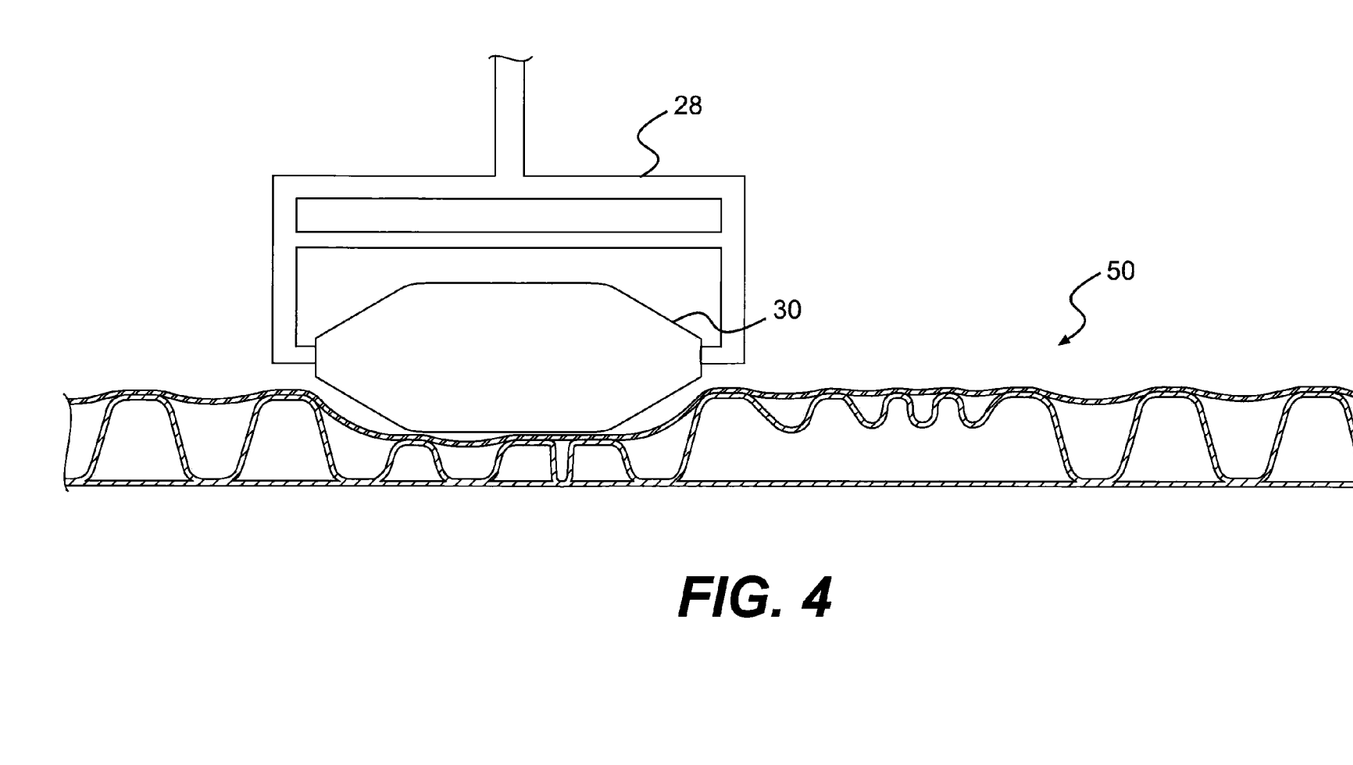
FIG. 4 is a cross-sectional view of an exemplary three-wall polymer pipe and a portion of the exemplary press rolling apparatus depicted in FIGS. 1-3.

FIG. 4 illustrates an exemplary embodiment of a bracket 28 and a pressing element 30 engaging a three-wall pipe 50. As illustrated in FIG. 4, pressing element 30 may be a relatively cylindrical press roller configured to rotate about a portion of bracket 28. In one embodiment, pressing element 30 may be a press roller made from a solid slug of Teflon®. Pressing element 30 may have a generally rounded profile configured to rotate about bracket 28 and roll across a surface of multi-wall pipe. As illustrated in FIG. 4, pressing element 30 may be a press roller having a substantially hexagonal cross-section. In another embodiment, pressing element 30 may be a press roller having a substantially octagonal cross-section. In yet another embodiment, pressing element 30 may be a press roller having a substantially circular cross-section. In yet another embodiment, pressing element 30 may be a press roller having a substantially rectangular cross-section. In yet another embodiment, pressing element 30 may be a press roller having a substantially square cross-section.

FIG. 4 illustrates the exemplary pressing element 30 contacting an outer wall of three-wall pipe 50. Specifically, pressing element 30 may press against an outer wall of three-wall pipe 50, thereby urging an outer wall of three-wall pipe 50 against an inner wall of three-wall pipe 50. It will be appreciated that the inward urging provided by press rolling mechanism 24 to pressing element 30 may be used to compress any two or more layers or walls of a pipe having any number of layers or walls, and any type of geometry. Specifically, as illustrated in FIG. 4, pressing element 30 may have any cross-sectional geometry that allows it to accommodate changing diameters along a length of multi-wall pipe. Moreover, pressing element 30 may be especially configured to accommodate changing diameters of pipe due to translation of pressing element 30 as allowed by translating member 32. Thus, pressing element 30 may be configured to press against a pipe having any desired diameter. However, regardless of any translation of pressing element 30, a sufficient amount of pressing force may be applied to an outer wall of multi-wall pipe by adjusting compression springs 42, via threaded bolts 48.

Thus, the presently disclosed press rolling apparatus 10, press rolling mechanisms 24, and pressing element 30 may be particularly advantageous for use in a method of pressing against an outer wall of pipe. The method may include extruding a layer of polymer from a cross-head die onto a pipe to form an outer wall of pipe. The method may further include conveying the pipe including the outer wall of pipe through a press rolling apparatus 10 having a pressing element 30 configured to rotate about the pipe. The method may further include mounting pressing element 30 to an annular carriage 16 and rotating annular carriage 16 about the pipe. The method may further include rotatably mounting pressing element 30 on a bracket 28 and urging bracket 28 and pressing element 30 against an exterior surface of the outer wall, via a spring bias, as pressing element 30 rotates about a pipe conveyed through press rolling apparatus 10. The method may further include rotating annular carriage 16 at a pre-determined velocity based on an outer diameter of the pipe and an axial velocity of the pipe through press rolling apparatus 10.

The presently disclosed apparatus and method may be advantageous in forming a proper bonding, fusion, or welding between adjacent layers of polymer in a multi-wall polymer pipe. Specifically, even when an outer wall of pipe is extruded at a high temperature, the presently disclosed apparatus and method may be used to increase the depth of bonding between the outer wall of pipe and an adjacent wall of a polymer pipe. As a result, a multi-wall pipe made by using the above-described exemplary apparatus and method may benefit from increased strength due to the ability of an outer wall of pipe to support forces on the outside of the pipe and from within the pipe. For example, when an outer wall is extruded onto a dual-wall pipe comprising a smooth inner wall and a corrugated wall, the pressing apparatus and method may allow the outer wall to better support tensile forces transmitted between adjacent corrugations of the corrugated wall.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of pressing an outer wall of polymer pipe, the method comprising:
   extruding a layer of polymer onto a pipe to form an outer wall of pipe;
   conveying the pipe including the outer wall of pipe through a pressing apparatus having: a frame having an annular carriage configured to rotate about an axis; a translating member configured to translate radially inward and radially outward relative to the annular carriage, and having opposing angled faces; at least two opposing spring-biased cam followers configured to engage the opposing angled faces and bias the translating member in a direction that is radially inward; and a press roller attached to the translating member and configured to orbit around said axis on a path defined by the annular carriage; and
   urging the press roller against an exterior surface of the outer wall as the press roller orbits about the pipe conveyed through the pressing apparatus.

2. The method of claim 1, wherein the pipe is a dual-wall pipe comprising a smooth inner wall and a corrugated wall, and said extruding a layer of polymer includes extruding a layer of polymer from a cross-head die onto the corrugated wall.

3. The method of claim 2, wherein the method further includes rotating the annular carriage about the pipe such that the press roller orbits about the pipe conveyed through the pressing apparatus.

4. The method of claim 3, wherein the press roller is rotatably mounted to a bracket disposed on the annular carriage, said method further includes rotating the press roller about a portion of the bracket while urging the press roller against the exterior surface of the outer wall of polymer pipe.

5. The method of claim 3, wherein the step of rotating the annular carriage comprises providing a drive belt around the annular carriage and rotating the drive belt so as to rotate the annular carriage.

6. The method of claim 5, wherein said rotating the drive belt comprises providing a motor in connection with the drive belt and operating the motor so as to selectively rotate the annular carriage.

7. The method of claim 1, further comprising: rotating the annular carriage at a pre-determined angular velocity.

8. The method of claim 7, wherein the pre-determined angular velocity is calculated based on an outer diameter of the pipe and an axial velocity of the pipe being conveyed through the pressing apparatus.

9. An apparatus for pressing an outer wall of polymer pipe, the apparatus comprising:
   a frame having an annular carriage configured to rotate about an axis;
   a translating member configured to translate radially inward and radially outward relative to the annular carriage, said translating member having opposing angled faces;
   at least two opposing spring-biased cam followers configured to engage the opposing angled faces and bias the translating member in a direction that is radially inward; and
   a press roller attached to the translating member and configured to orbit around said axis on a path defined by the annular carriage;

wherein the press roller is configured to press an outer wall of polymer pipe when the pipe is conveyed through the annular carriage.

10. The apparatus of claim 9, wherein the frame comprises a bearing, and the annular carriage is configured to rotate about a center point of the annular carriage, as guided by the bearing.

11. The apparatus of claim 9, wherein the frame comprises four bearings, each of the four bearings being disposed on a quadrant of the frame, and the annular carriage is configured to rotate about a center point of the annular carriage, as guided by the four bearings.

12. An apparatus for pressing an outer wall of polymer pipe, the apparatus comprising:
- a frame having a bearing;
- an annular carriage configured to rotate about an axis as guided by the bearing;
- a translating member configured to translate radially inward and radially outward relative to the annular carriage, said translating member having opposing angled faces;
- at least two opposing spring-biased cam followers configured to engage the opposing angled faces and bias the translating member in a direction that is radially inward; and
- a press roller translatably mounted to the translating member and configured to orbit around said axis on a path defined by the annular carriage;
- wherein the press roller is configured to press an outer wall of polymer pipe when the pipe is conveyed through the annular carriage.

13. The apparatus of claim 12, further comprising a bracket configured to mount the press roller to the translating member, wherein the press roller is configured to rotate about a portion of the bracket.

14. The apparatus of claim 12, wherein the frame comprises four bearings, each of the four bearings being disposed on a quadrant of the frame, and the annular carriage is configured to rotate about a center point of the annular carriage, as guided by the four bearings.

15. The apparatus of claim 12, wherein the press roller is generally cylindrical in shape and, at either end of the cylindrical shape, is angled toward an axis about which the press roller rotates.

16. The apparatus of claim 12, wherein each of the spring-biased cam followers is engaged with a threaded bolt configured to adjust an axial length of a compression spring disposed in the spring-biased cam follower, for modifying an amount of bias provided by the spring biased cam follower.

17. The apparatus of claim 9, further comprising a bracket configured to mount the press roller to the translating member, wherein the press roller is configured to rotate about a portion of the bracket.

18. The apparatus of claim 9, wherein the press roller is generally cylindrical in shape and, at either end of the cylindrical shape, is angled toward an axis about which the press roller rotates.

19. The apparatus of claim 9, wherein the frame comprises four bearings, each of the four bearings being disposed on a quadrant of the frame, and the annular carriage is configured to rotate about a center point of the annular carriage, as guided by the four bearings.

20. The apparatus of claim 9, wherein the each of the spring-biased cam followers is engaged with a threaded bolt configured to adjust an axial length of a compression spring disposed in the spring-biased cam follower, for modifying an amount of bias provided by the spring biased cam follower.

* * * * *